United States Patent [19]

Nakano

[11] Patent Number: 4,957,472
[45] Date of Patent: Sep. 18, 1990

[54] TRACK FOR SNOW VEHICLE
[75] Inventor: Tomio Nakano, Iwata, Japan
[73] Assignee: Yamaha Hatsudoki Kabushiki Kaisha, Iwata, Japan
[21] Appl. No.: 387,934
[22] Filed: Aug. 1, 1989
[30] Foreign Application Priority Data
   Aug. 2, 1988 [JP] Japan ................ 63-192091
[51] Int. Cl.$^5$ ........................... F16H 7/02
[52] U.S. Cl. ...................... 474/203; 305/35 EB; 474/205
[58] Field of Search ............... 474/203–205, 474/901, 152, 153; 180/9; 305/35 EB
[56] References Cited
   U.S. PATENT DOCUMENTS
   3,276,823 10/1966 Tucker, Jr. ............. 305/35 EB
   3,853,016 12/1974 Lane, III et al. ........ 474/205 X
   3,888,132 6/1975 Russ, Sr. .............. 305/35 EB X Primary Examiner—Thuy M. Bui
Attorney, Agent, or Firm—Ernest A. Beutler

[57] ABSTRACT

A snow vehicle and more particularly an improved track and driving arrangement therefor. The track has lugs on one side that are engaged with teeth of a drive sprocket for driving the track in a positive manner. The opposite side of the track and that which faces the ground has pairs of teeth disposed on opposite sides of the track drive lugs and each having different configurations which are mirror images of each other. One of the teeth of the pairs is configured to provide good traction in soft snow on its forward face and good traction on hard snow in its rearward face while the other tooth provides the opposite effects so that good traction will be provided in either direction of drive.

19 Claims, 5 Drawing Sheets

Figure 5
Figure 6
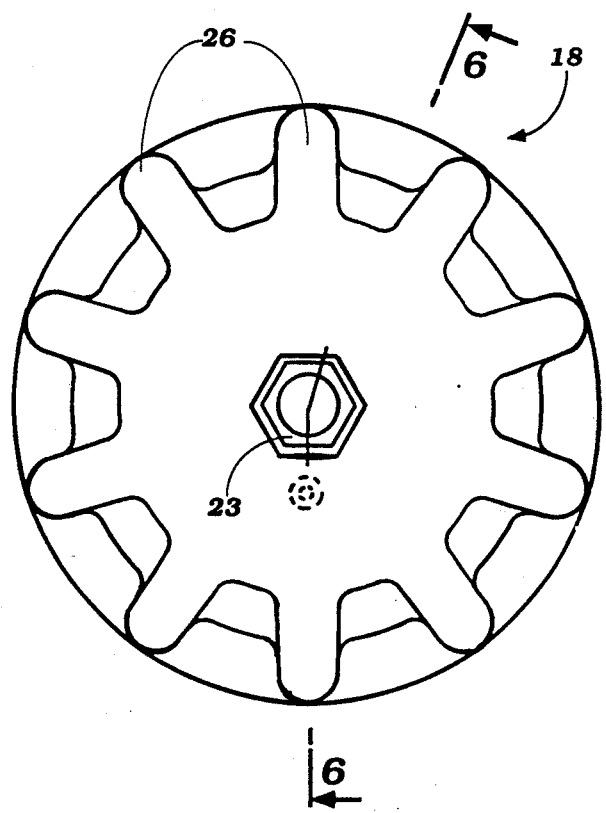
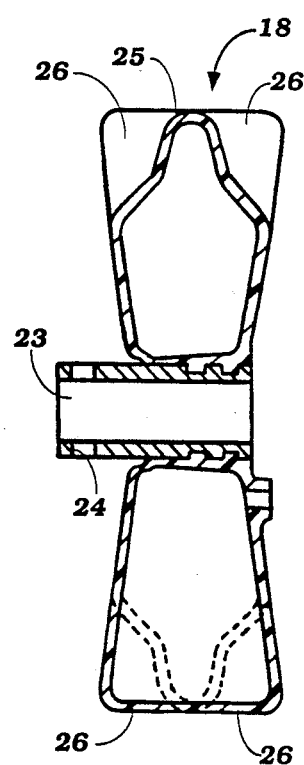

TRACK FOR SNOW VEHICLE

BACKGROUND OF THE INVENTION

This invention relates to a track for a snow vehicle and more particularly to an improved track configuration that improves the driving force over all terrains.

Conventionally, the driving tracks for snow vehicles such as snow throwers, snow mobiles or the like cooperate with a driving sprocket so as to transfer drive from a prime mover to the drive belt. The drive belt, in turn, contacts the surface along which the vehicle is travelling for driving the vehicle. Conventionally, the driving sprocket and drive belt have interengaging teeth or lugs for providing a positive drive between the drive sprocket and the belt. In a like manner, the belt has teeth on its outer surface that engage the terrain for driving the vehicle therealong.

In connection with the configuration of the driving teeth on drive belts for snow vehicles, it is well known that the configuration of the drive tooth must be tailored to the surface along which the vehicle is travelling. Vehicles that travel primarily on soft snow require a drive tooth that has considerably different configuration than that which will travel on packed snow or ice. As a result, it has been the practice to compromise the design of the driving teeth of the drive belt so that the drive belt will be adapted to a wide variety of snow conditions. Such comprises, however, mean that the drive belt is not optimally configured for all types of surfaces.

It is, therefore, a principal object of this invention to provide an improved drive belt for a snow vehicle that is configured so as to provide optimum driving conditions over a wide variety of terrain.

It is a further object of this invention to provide a drive belt for a snow vehicle wherein different configuration teeth are employed on the belt so as to adapt itself to a wide variety of snow conditions.

It also has been the practice to position the drive teeth of the driving surface of the belt in direct alignment with the driving lugs of the belt which interengage with the sprocket. As a result, the drive teeth are quite wide and relatively stiff. Although this may be advantageous for some applications, it does not provide the capability of providing maximum driving traction under all conditions.

It is, therefore, a principal object of this invention to provide an improved drive track for a snow vehicle that permits the use of a greater number of a smaller cross sectional area drive teeth than with previous constructions.

It is a further object of this invention to provide an improved drive belt for a snow vehicle for all conditions.

SUMMARY OF THE INVENTION

A first feature of the invention is also adapted to be embodied in a drive belt for a snow vehicle or the like and which has a surface that is adapted to engage the snow surface and provide a driving engagement therewith. The drive belt surface has a plurality of drive teeth formed there-along and which project therefrom for improving the traction. Certain of the teeth are configured differently from others of the teeth for improving traction on different types of surfaces.

A further feature of the this invention is adapted to be embodied in a driving arrangement for a snow travelling vehicle that is comprised of a drive sprocket and a driven belt having a first side engaged with the driving sprocket. The driving sprocket and the drive belt have interengaging teeth for effecting a positive drive of the drive belt from the driving sprocket. The drive belt has a second side that faces opposite from the first side and that is adapted to engage the snow surface for propelling the vehicle therealong. The second side of the drive belt is formed with a pair of driving teeth comprised of first and second teeth spaced on opposite sides of the respective of the interengaging teeth of the first surface of the drive belt.

A yet further feature of the invention is adapted to be embodied in a drive belt of the type described in the preceding paragraph.

BRIEF DESCRIPTION OF THE DRAWINGS

FIG. 5 is an enlarged side elevational view of the drive sprocket.

FIG. 6 is a cross sectional view taken along the line 6—6 of FIG. 5.

DETAILED DESCRIPTION OF THE PREFERRED EMBODIMENT OF THE INVENTION

Figure 1:
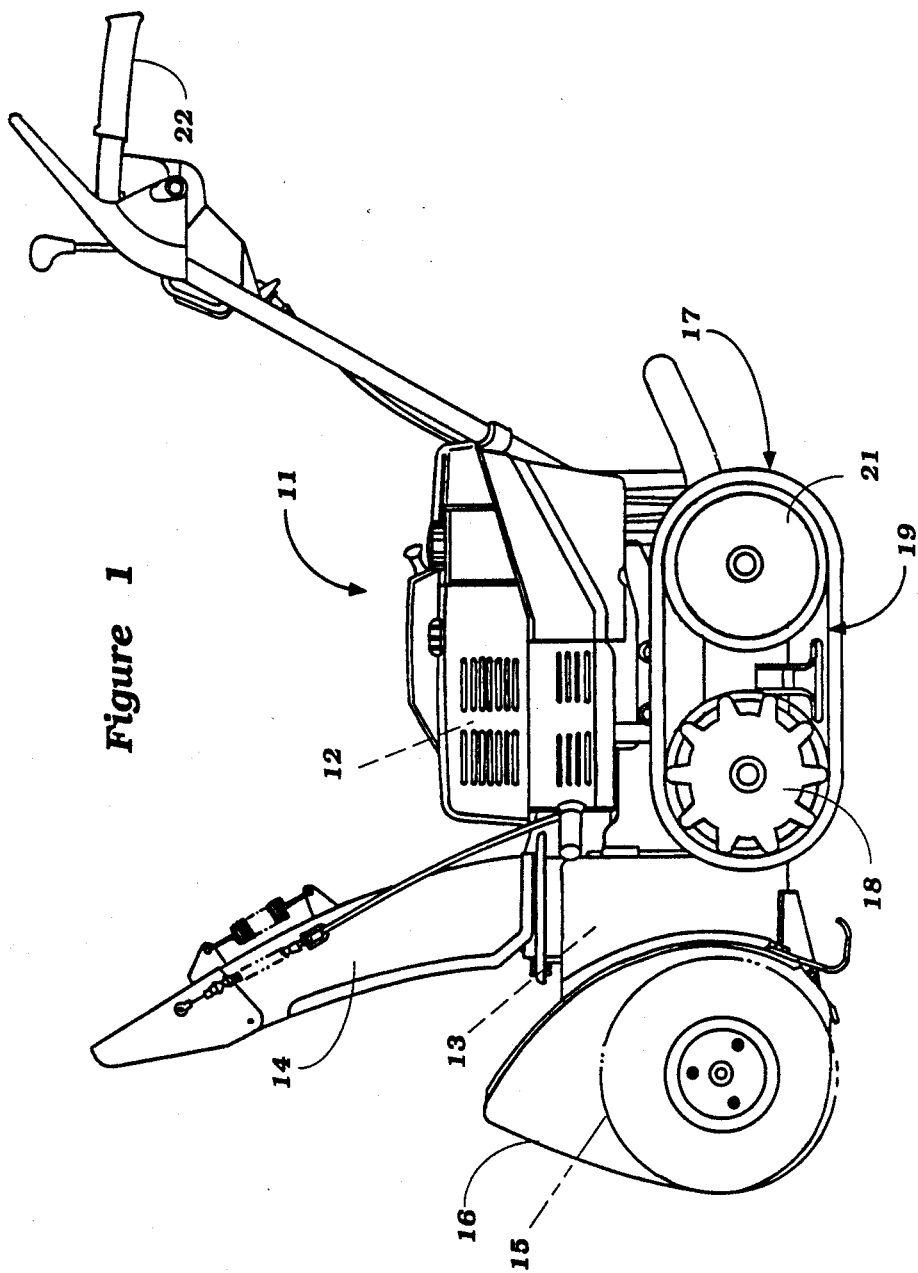
FIG. 1 is a side elevational view of a snow thrower driven by a drive arrangement constructed in accordance with an embodiment of the invention.

Referring first to FIG. 1, a snow blower is indicated generally by the reference numeral 11 and is depicted as a typical type of vehicle that can be powered by a drive belt constructed in accordance with the invention. It is to be understood, however, that the invention can be equally as well practiced with a wide variety of other types of snow vehicles. The invention has particular utility, however, in vehicles that are designed to travel over a wide variety of snow and/or ice surfaces.

The snow blower 11 is comprised of a main body portion 12 that contains a powering prime mover such as an internal combustion engine or the like. This prime mover drives a snow thrower (not shown) that is contained within an impeller housing 13 for discharging snow from a chute 14. Snow is delivered to the impeller housing 13 by an auger 15 which is also driven by the prime mover, and which is contained within an auger housing 16.

A driving arrangement indicated generally by a reference numeral 17 is provided for propelling the snow thrower 11 along the ground. This driving arrangement 17 includes a driving sprocket 18 positioned at each side of the frame 12 and which is driven from the engine in a known manner. A drive belt 19 is trained around the driving sprocket 18 and an idler sprocket 21 for propelling the snow thrower.

A handlebar assembly 22 is positioned at the rear of the frame 12 and contains a variety of controls for permitting the operator to control the snow thrower 11. These controls include a transmission control for driving the drive sprocket 18 in either a forward or reverse direction so that the snow thrower 11 can be driven forwardly or rearwardly.

Referring now in detail to the remaining figures and initially primarily to FIGS. 3 through 6, the drive sprocket 18 is provided with a hub portion 23 that is affixed in a known manner to a driving axle for rotation with the driving axle. A hole 24 is formed in an extending portion of the hub 23 so as to accommodate a locking bolt or drive pin for this purpose. The sprocket 18 further includes a rim or driving member that is affixed to the hub 23 and which may be formed from a blow molded plastic. This portion includes a generally continuous centrally positioned rib 25 having an arcuate outer surface. A plurality of pairs of driving teeth 26 extend transversely outwardly from the rib portion 25 at circumferentially spaced positions so as to provide a positive driving arrangement with the associated belt 19, in a manner which will be described.

Figure 7:
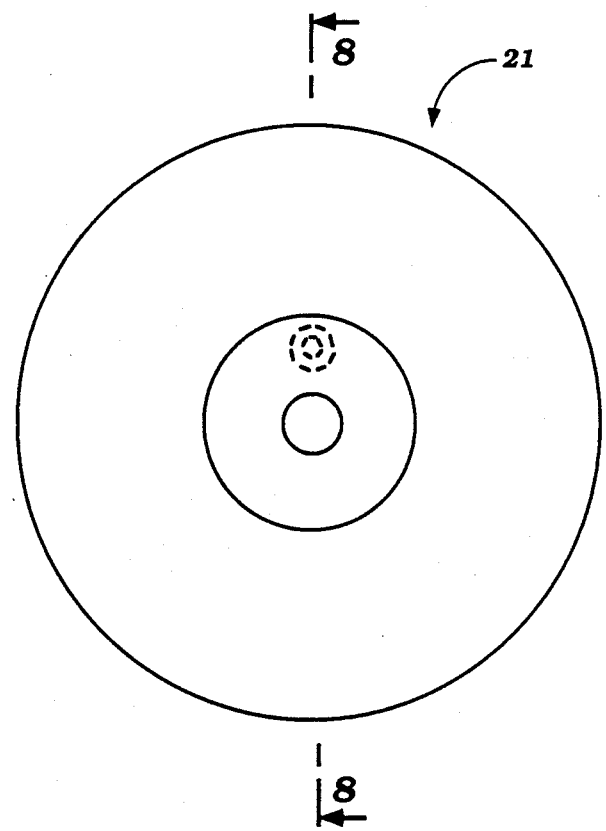
FIG. 7 is a side elevational view of an idler sprocket.
Figure 8:
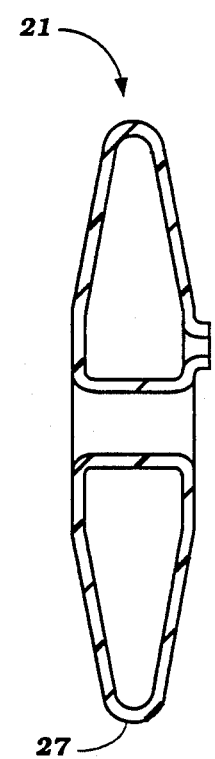
FIG. 8 is a cross-sectional view taken along the line 8—8 of FIG. 7.

Referring now to FIGS. 7 and 8, it will be seen that the idler sprocket 21 may also be formed from blow molded plastic and they have only a cylindrical or curved surface 27 that is frictionally engaged with the driving belt.

Figure 2:
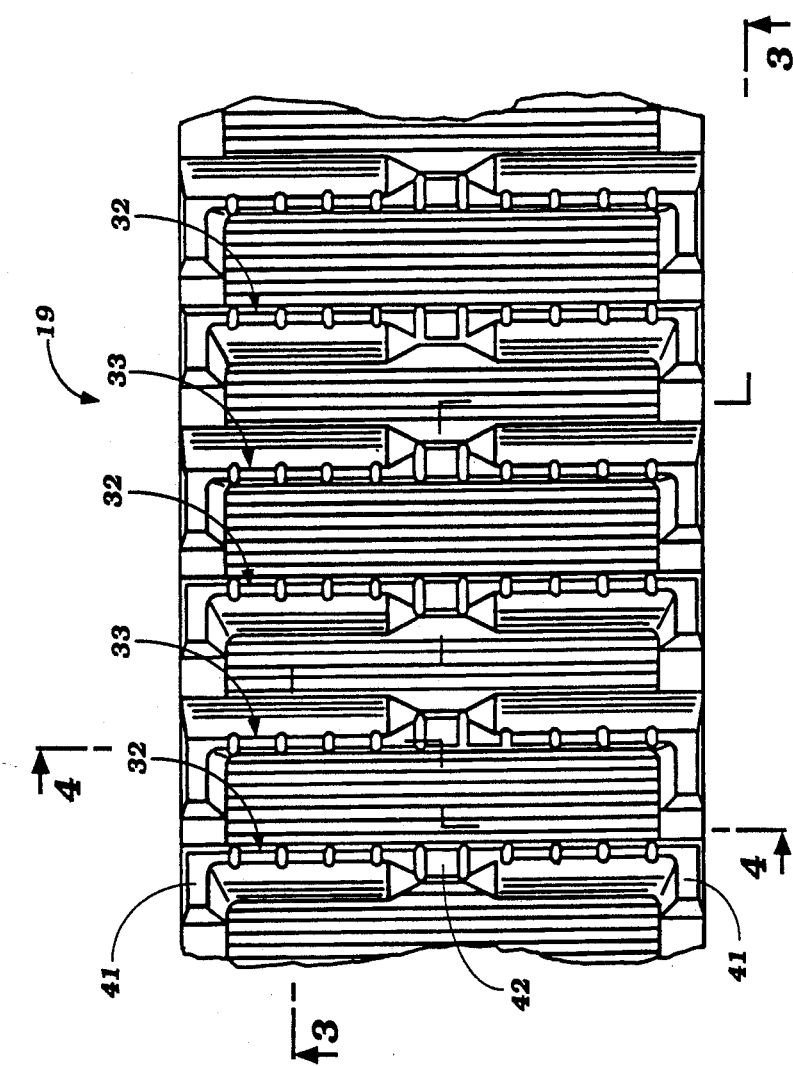
FIG. 2 is an enlarged top plan view of the drive belt.
Figure 3:
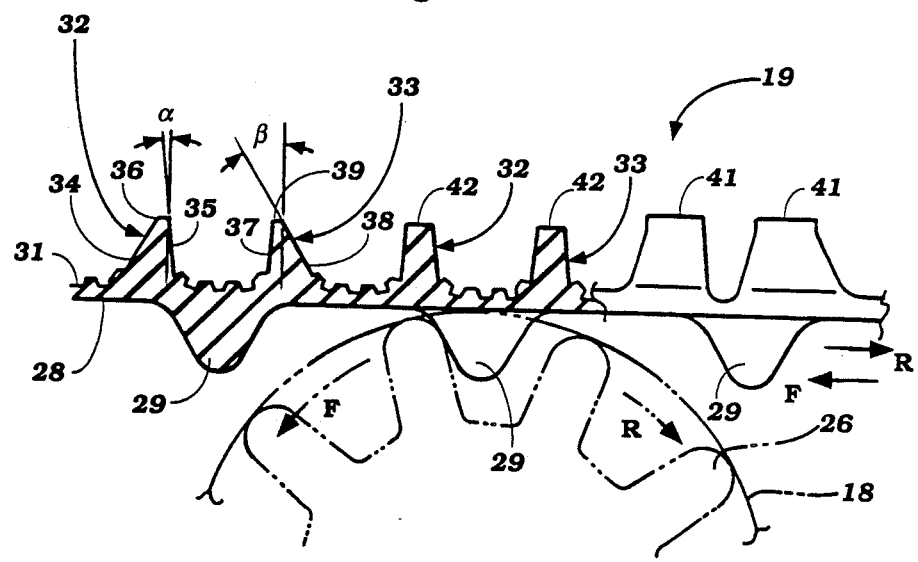
FIG. 3 is a further enlarged cross-sectional view taken along the line 3—3 of FIG. 2. In this view, the drive sprocket is shown in phantom and in engagement with a portion of the drive belt other than that actually engaged merely to show how the teeth of the drive belt interengage with the teeth of the driving sprocket.
Figure 4:
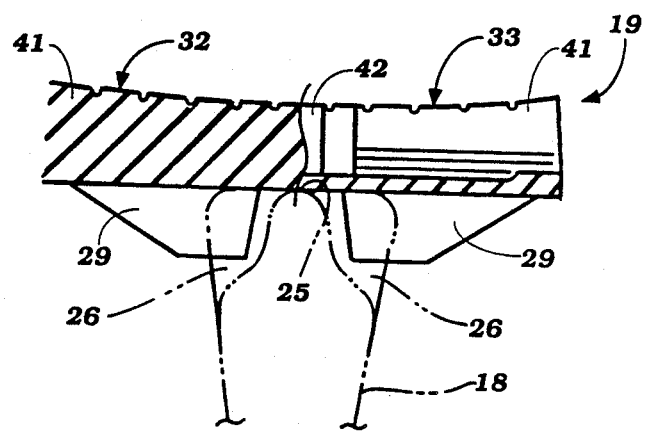
FIG. 4 is an enlarged cross-sectional view taken along the line 4—4 of FIG. 2 again showing the drive sprocket in phantom and out of its normal position to show how it interengages with the drive belt.

Referring now primarily to FIGS. 2 through 4, the configuration of the driving belt 19 and its cooperation with the driving sprocket 18 and the ground will be described. The driving belt 19 may be formed from any known elastomeric types of materials and may also be reinforced if desired. The drive belt 19 has a back or inner surface 28 that faces the drive sprocket 18 and idler sprocket 21. This face 28 is formed with a plurality of pairs of transversely extending lugs 29 which are spaced circumferentially at a distance equivalent to the distance to the drive lugs 26 of the drive sprocket 18 so as to be positively and drivingly engaged thereby. As may be seen in FIG. 3, the lugs 29 have a somewhat toothlike configuration with a rounded tip. In cross section as seen in FIG. 4, the lugs 29 have a generally trapezoidal shape and in addition to extending into the area between the lugs 26 of drive sprocket 18 they extend outwardly to the outer periphery of the drive belt 19. As may be clearly seen in FIG. 4, the drive belt 19 has a substantially greater width than the drive sprocket 18 and the width of the lugs 29 insures that a driving force will be transmitted substantially uniformly across the width of the drive belt 19 so as to avoid internal fluctures. Also, the lugs 19 are transversely spaced apart so as to clear the portion 25 of the drive sprocket 18.

With conventional prior art type of drive belts the drive belt is also provided with teeth or driving lugs on the side opposite the face the which teeth are aligned with the driving lugs 29. In accordance with the invention, however, the outer surface, indicated generally by the reference numeral 31, of the drive belt 19 is provided with pairs of driving teeth 32 and 33 which are differently configured and which are spaced at opposite sides of the drive lugs 29 in the direction of drive. That is, the tooth 32 is positioned forwardly of the drive lug 29 in the direction of forward drive as is indicated by the arrows "F" while the tooth 33 is positioned rearwardly of the drive lug 29 in this direction but forwardly of the drive lugs 28 in the direction of reverse drive indicated by the arrows "R".

The drive teeth 32 and 33 are configured differently from each other but are, in fact, substantially mirror images of each other for simplicity purposes and so as to provide equal driving traction on all surfaces in either direction of travel. By employing different configurations, however, the drive teeth 32 and 33 will offer optimum driving conditions under all directions of travel.

It should be noted that each tooth 32 is comprised generally of an angularly inclined leading surface 34 and an angularly inclined trailing surface 35 which surfaces are disposed at different angles to the surface 31 of the belt from which they emanate and are not at the same angle to each other. The surfaces 34 and 35 do not intersect but merely terminate in a generally flat tip 36. The surface 34 is inclined at a shallower angle to the belt face 31 than is the surface 35 with the surface 25 being much closer to perpendicular.

In a similar manner the tooth 33 which, as has been noted, constitutes a mirror image of the tooth 32 has a leading surface 37 which is disposed at a steep angle to the surface 31 and a trailing surface 38 that is disposed at a shallower angle. The angles of the surfaces 34 and 38 is indicated as while the angles of the surfaces 35 and 37 is indicated at with these angles being related to the perpendicular to the surface 31. In a preferred embodiment of the invention, the angle may be in the range of 0 to 10 degrees while the angle is in the range of 20 to 45 degrees.

Because of the shallow angle of the surfaces 34, when the snow blower 11 is travelling over fresh, soft or light snow, the teeth 32 will sink in and bit and compress the snow to give a good forward driving thrust. On the other hand, when driving over icy or hard packed snow to the surfaces 37 operate with the flattened surfaces 39 at the upper end there of to bite in and provide a good driving thrust. That is, the teeth 32 tend to be more flexible in the forward driving direction while the teeth 33 tend to be more rigid and vice versa.

It will also be noted from FIGS. 2 through 4 that the teeth 32 and 33 are not of a continuous configuration across their full transverse width. At the ends of each of the teeth, there are provided lugs 41 that extend generally in the forward direction of travel. The lugs 41 are positioned only at the outer peripheral edges of the teeth 32 and 33. In addition, in the area immediately adjacent where the driving sprocket portion 25 and the idler sprocket portion 27 engage the backside of the belt 19, there are interruptions in the teeth 32 and 33 and there are formed individual teeth 42. The teeth 42 have a different configuration from the remaining portions of the teeth 32 and 33. Specifically, both the leading and trailing sides of the teeth 42 are disposed at the angle and the flats at the top of these teeth are slightly wider than the remaining teeth. As a result, these teeth portions 42 are more rigid than the remainder of the belt in both directions of travel and assist in traveling over paved surfaces.

It should be readily apparent from the foregoing description that the embodiment of the invention is particularly useful in providing a high efficiency drive belt for a snow vehicle that will operate over a wide variety of terrain with equal efficiency. In addition, the tooth configuration permits a greater number of teeth than those of the prior art with more flexibility under certain conditions. The foregoing is, of course, a description only of a preferred embodiment of the invention and various changes and modifications may be made without departing from the spirit and scope of the invention, as defined by the appended claims. For example, in the illustrated embodiment the different configuration teeth 32 and 33 have been arranged in pairs. It is to be understood, however, that the different configuration teeth may be interspersed with each other in a variety of patterns and may even be randomly positioned along the length of the drive belt.

I claim:

1. A drive belt for a snow vehicle or the like comprising a surface adapted to engage the snow surface and providing driving engagement therewith, a plurality of drive teeth formed on said surface and projecting therefrom for improving the traction, certain of said teeth being configured differently other of said teeth for improving traction on different types of surfaces.

2. A drive belt for a snow vehicle as set forth in claim 1 wherein the teeth have different angles of inclination in their drive direction.

3. A drive belt for a snow vehicle as set forth in claim 2 wherein the different teeth have different angles of inclination on their rearward faces.

4. A drive belt for a snow vehicle as set forth in claim 3 wherein the different teeth are mirror images of each other.

5. A drive belt for a snow vehicle as set forth in claim 4 wherein the teeth are arranged in pairs and there are two different types of teeth.

6. A drive belt for a snow vehicle as set forth in claim 5 wherein the teeth are interrupted transversely across their surfaces.

7. A driving arrangement for a snow travelling vehicle comprising a driving sprocket, a drive belt having a first side engaged with said driving sprocket, said driving sprocket and said drive belt having interengaging teeth for effecting a positive drive of said drive belt from said driving sprocket, said interengaging teeth of said first surface comprise lugs formed on said drive belt, said drive belt having a second side facing oppositely from said first side and adapted to engage the snow surface from propelling the vehicle therealong, said second side of said drive belt being formed with pairs of driving teeth comprising first and second teeth spaced on opposite sides of the respective of the interengaging teeth of said first surface of said drive belt, said drive sprocket having a continuous cylindrical center portion transverse to its axis of rotation engaged with the center of said belt continuously and pairs of drive lugs spaced therefrom and engaging said drive lugs on said belt for transferring the drive thereto.

8. A driving arrangement as set forth in claim 7 wherein the first and second teeth have different shapes.

9. A driving arrangement as set forth in claim 8 wherein the leading edge of the first teeth of the pairs is disposed at a relatively shallow angle to the second surface of the drive belt and the leading edges of the second teeth of the pairs are disposed at relatively steep angles to the second surface of the drive belt.

10. A driving arrangement as set forth in claim 9 wherein the first and second teeth are mirror images of each other whereby the second tooth provides the same driving effect when travelling in a reverse direction as the first tooth does when travelling in the forward direction and vice versa.

11. A driving arrangement for a snow travelling vehicle comprising a driving sprocket, a drive belt having a first side engaged with said driving sprocket, said driving sprocket and said drive belt having interengaging teeth for effecting a positive drive of said drive belt from said driving sprocket, said drive belt having a second side facing oppositely from said first side and adapted to engage the snow surface from propelling the vehicle therealong, said second side of said drive belt being formed with pairs of driving teeth comprising first and second teeth spaced on opposite sides of the respective of the interengaging teeth of said first surface of said drive belt, wherein the first and second teeth have different shapes.

12. A driving arrangement as set forth in claim 11 wherein the leading edge of the first teeth of the pairs is disposed at a relatively shallow angle to the second surface of the drive belt and the leading edges of the second teeth of the pairs are disposed at relatively steep angles to the second surface of the drive belt.

13. A driving arrangement as set forth in claim 12 wherein the first and second teeth are mirror images of each other whereby the second tooth provides the same driving effect when travelling in a reverse direction as the first tooth does when travelling in the forward direction and vice versa.

14. A drive belt for snow vehicle comprised of a first side adapted to be engaged with a driving sprocket, a plurality of lugs formed on said first side and adapted to cooperate with a drive member for driving said drive belt, said drive belt having a second side facing oppositely from said first side and adapted to engage the snow surface for propelling a vehicle therealong, said second side of said drive belt being formed with pairs of driving teeth comprised of first and second teeth having different shapes spaced on opposite sides of the respective lugs on said first side of said drive belt.

15. A drive belt as set forth in claim 14 wherein the drive lugs on the belt are arranged in transversely spaced pairs.

16. A drive belt as set forth in claim 15 wherein the leading edge of the first teeth of the pairs is disposed at a relatively shallow angle to the second surface of the drive belt and the leading edges of the second teeth of the pairs are disposed at relatively steep angles to the second surface of the drive belt.

17. A drive belt as set forth in claim 16 wherein the first and second teeth are mirror images of each other whereby the second tooth provides the same driving effect when travelling in a reverse direction as the first tooth does when travelling in the forward direction and vice versa.

18. A drive belt as set forth in claim 14 wherein the leading edge of the first teeth of the pairs is disposed at a relatively shallow angle to the second surface of the drive belt and the leading edges of the second teeth of the pairs are disposed at relatively steep angles to the second surface of the drive belt.

19. A drive belt as set forth in claim 14 wherein the first and second teeth are mirror images of each other whereby the second tooth provides the same driving effect when travelling in a reverse direction as the first tooth does when travelling in the forward direction and vice versa.

* * * * *